US009352450B1

(12) United States Patent
Vail et al.

(10) Patent No.: US 9,352,450 B1
(45) Date of Patent: May 31, 2016

(54) METHODS OF CLEANING A POLYCRYSTALLINE DIAMOND BODY AND METHODS OF FORMING POLYCRYSTALLINE DIAMOND COMPACTS

(71) Applicant: US Synthetic Corporation, Orem, UT (US)

(72) Inventors: Michael A. Vail, Genola, UT (US); Paul D. Jones, Elk Ridge, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 61 days.

(21) Appl. No.: 14/166,443

(22) Filed: Jan. 28, 2014

(51) Int. Cl.

| | |
|---|---|
| ***B24D 3/00*** | (2006.01) |
| ***B24D 11/00*** | (2006.01) |
| ***B24D 18/00*** | (2006.01) |
| ***C09K 3/14*** | (2006.01) |
| ***B24D 3/02*** | (2006.01) |
| ***B24B 1/00*** | (2006.01) |
| ***B08B 3/08*** | (2006.01) |
| ***B24D 3/10*** | (2006.01) |

(52) U.S. Cl.
CPC .............. *B24D 18/0027* (2013.01); *B08B 3/08* (2013.01); *B24D 3/10* (2013.01)

(58) Field of Classification Search
USPC .................................... 51/295, 293, 307, 308
See application file for complete search history.

(56) References Cited

U.S. PATENT DOCUMENTS

| | | | | |
|---|---|---|---|---|
| 7,845,438 | B1 * | 12/2010 | Vail | C22C 26/00 175/426 |
| 7,866,418 | B2 * | 1/2011 | Bertagnolli | 175/328 |
| 7,998,573 | B2 * | 8/2011 | Qian | B24D 3/10 428/325 |
| 8,024,136 | B2 * | 9/2011 | Jezernik | G01F 1/3209 702/45 |
| 8,236,074 | B1 * | 8/2012 | Bertagnolli | B24D 99/005 175/420.2 |
| 2010/0095602 | A1 * | 4/2010 | Belnap | C04B 35/52 51/309 |
| 2013/0213433 | A1 * | 8/2013 | Bellin | B08B 3/12 134/1 |
| 2013/0247478 | A1 * | 9/2013 | Bellin | E21B 10/00 51/307 |
| 2013/0248258 | A1 * | 9/2013 | Bellin | E21B 10/00 175/428 |

OTHER PUBLICATIONS

U.S. Appl. No. 61/897,764, filed Oct. 30, 2013, Vail.
U.S. Appl. No. 13/027,954, filed Feb. 15, 2011, Miess, et al.

* cited by examiner

*Primary Examiner* — James McDonough
(74) *Attorney, Agent, or Firm* — Dorsey & Whitney LLP

(57) ABSTRACT

Embodiments of the invention relate to methods of cleaning a leaching agent and/or leaching agent by-products from an at least partially leached polycrystalline diamond body, and methods of making a polycrystalline diamond compact using the same.

20 Claims, 9 Drawing Sheets

METHODS OF CLEANING A POLYCRYSTALLINE DIAMOND BODY AND METHODS OF FORMING POLYCRYSTALLINE DIAMOND COMPACTS

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer (also known as a diamond table). The diamond table is formed and bonded to a substrate using an ultra-high pressure, ultra-high temperature ("HPHT") process. The PDC cutting element may also be brazed directly into a preformed pocket, socket, or other receptacle formed in the bit body. The substrate may be often brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container or cartridge with a volume of diamond particles positioned adjacent to a surface of the cemented-carbide substrate. A number of such cartridges may be loaded into an HPHT press. The substrates and volume of diamond particles are then processed under HPHT conditions in the presence of a catalyst that causes the diamond particles to bond to one another to form a matrix of bonded diamond grains defining a polycrystalline diamond ("PCD") table. The catalyst is often a metal-solvent catalyst, such as cobalt, nickel, iron, or alloys thereof that is used for promoting intergrowth of the diamond particles.

In one conventional approach for forming a PDC, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a solvent catalyst to promote intergrowth between the diamond particles, which results in formation of bonded diamond grains. A solvent catalyst may be mixed with the diamond particles prior to subjecting the diamond particles and substrate to the HPHT process.

In another conventional approach for forming a PDC, a sintered PCD table may be separately formed and then leached to remove solvent catalyst from interstitial regions between bonded diamond grains. The leached PCD table may be simultaneously HPHT bonded to a substrate and infiltrated with a non-catalyst material, such as silicon, in a separate HPHT process. The silicon may infiltrate the interstitial regions of the sintered PCD table from which the solvent catalyst has been leached and react with the diamond grains to form silicon carbide.

SUMMARY

Embodiments of the invention relate to methods of at least partially removing a leaching agent and/or leaching by-products from a PCD body to clean the PCD body, and methods of fabricating leached PCD bodies and PDCs in which a removal agent is used to remove a leaching agent and/or leaching by-product from at least a portion of a leached PCD body. Pressurized fluid flow of the removal agent through the interstitial spaces in the leached PCD body may provide more rapid and effective removal/cleaning of the leaching agent and/or leaching by-product from a PCD body than traditional soaking in a fluid.

In an embodiment, a method of cleaning an at least partially leached PCD body is disclosed. A PCD body may be positioned in a pressure vessel such that at least one surface of the PCD body is exposed to an environment inside of the pressure vessel. The pressure vessel may be at least partially filled with a removal agent. The pressure and/or temperature in the pressure vessel may then be elevated above an ambient pressure and/or an ambient temperature in an environment outside the pressure vessel, at which point the removal agent may diffuse/flow through the PCD body, thereby dissolving, sweeping, combinations thereof, or otherwise removing leaching agents and/or leaching by-products. In an embodiment, a fluid in a super critical state may be utilized as a removal agent component.

In an embodiment, a method of fabricating a PDC is disclosed. A PCD body is provided, which includes a plurality of bonded diamond grains defining a plurality of interstitial regions in which a catalyst is disposed. The PCD body may then be leached with a leaching agent to at least partially remove the catalyst from the PCD body. In an embodiment, the leaching agent may include a supercritical fluid component, an aqueous component, an organic component, or combinations of the foregoing. The at least partially leached PCD body may then be cleaned substantially as described above to at least partially remove the leaching agent and/or leaching by-products from the at least partially leached PCD body. After cleaning, the at least partially leached and cleaned polycrystalline diamond body may be bonded to a substrate to form a polycrystalline diamond compact Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to methods of at least partially removing leaching agents and/or leaching by-products from a PCD body to clean the PCD body, and methods of fabricating leached PCD bodies and PDCs, resultant PCD bodies and PDCs, and applications for such PCD bodies and PDCs. Cleaning an at least partially leached PDC using a removal agent under elevated pressure and/or elevated temperature, including pressure resulting in supercritical fluids, may provide rapid and efficient removal of leaching agents and/or leaching by-products from the PCD body. The PDC embodiments disclosed herein may be used in a variety of applications, such as rotary drill bits, bearing apparatuses, wire-drawing dies, machining equipment, and other articles and apparatuses.

As used herein, "elevated pressure" or "elevated temperature" refers to a pressure or a temperature relative to ambient pressure or temperature outside of the leaching and/or pressure vessel. As used herein, "a supercritical fluid component" may refer to any substance at a temperature and pressure above its critical point, where a distinct liquid and gas phase boundary does not exist (i.e., fluid in a supercritical state) and/or any substance capable of being placed in such a supercritical state. A supercritical fluid component can effuse through solids like a gas, and may dissolve materials or have mass transport properties like a liquid.

FIGS. 1A-1F are cross-sectional views illustrating different stages in a method of fabricating a PDC according to an embodiment that includes forming a PCD body from a plurality of diamond particles and a catalyst in a first HPHT process and at least partially leaching the PCD body so-formed by exposing the PCD body to a leaching agent. The at least partially leached PCD body is exposed to a removal agent including, but not limited to, an aqueous component, a supercritical fluid, an organic component, an inorganic component, or combinations thereof under elevated pressure and/or temperature to remove leaching agent and/or leaching by-products from the PCD body, thereby cleaning the PCD body. Such a method may provide for more rapid and effective removal of the leaching agent and/or leaching by-products from the PCD body than conventional diffusional cleaning processes. A PDC may be formed by bonding the at least partially leached and cleaned PCD body to a substrate in a second HPHT process, which infiltrates the at least partially leached and cleaned PCD body with an infiltrant. The PDC so-formed may be subsequently shaped to provide a peripherally-extending chamfer.

A PCD body may be formed by subjecting diamond particles in the presence of a catalyst to HPHT sintering conditions. In embodiments, the catalyst may be in the form of a powder, a disc, a foil, or in a cemented carbide substrate. The PCD body may be formed independently from or integrally with a substrate, both under HPHT conditions.

Figure 1A:
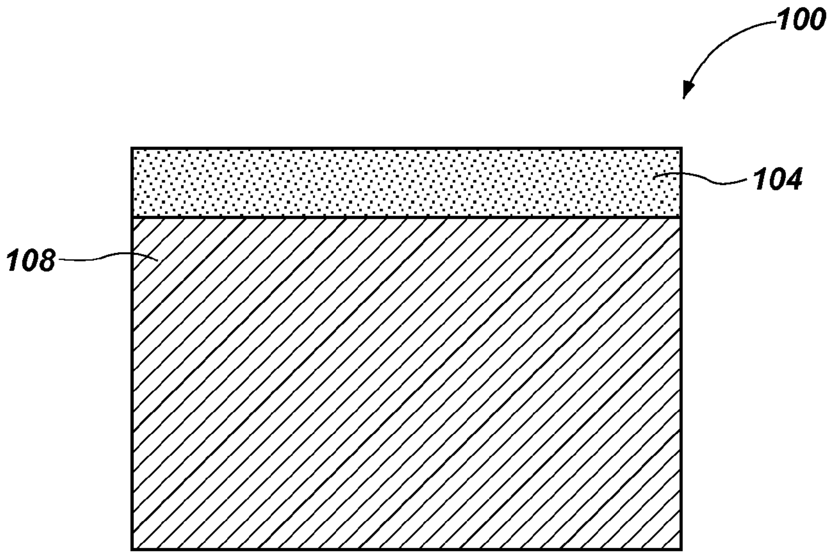
FIGS. 1A-1F are cross-sectional views illustrating different stages in a method of fabricating a PDC in which a pressurized removal agent is used for cleaning a PCD body according to an embodiment.
Figure 1B:
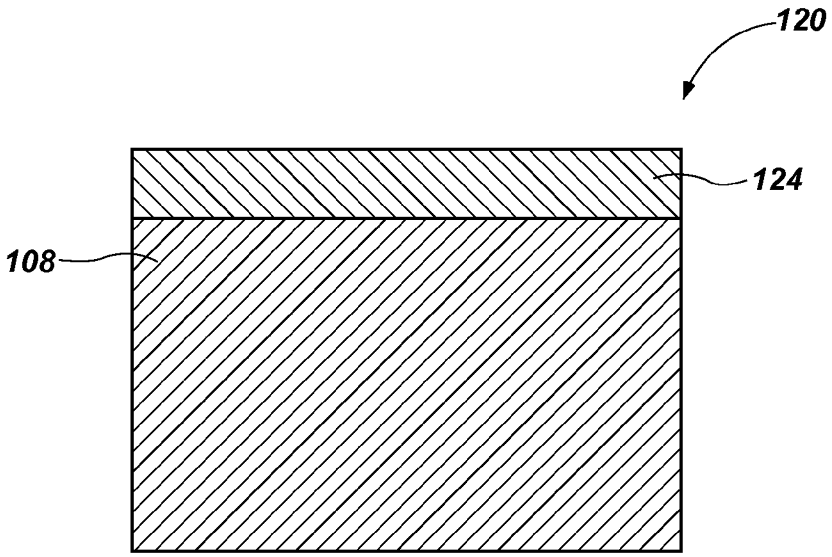

Referring to FIG. 1A, a cross-sectional view of an assembly 100 is illustrated in which a plurality of diamond particles 104 are placed adjacent to a substrate 108. A PCD body/table 124 as shown in FIG. 1B may be fabricated by subjecting the assembly 100 including the plurality of diamond particles 104 (e.g., diamond particles having an average particle size between 0.5 μm to about 150 μm) and the substrate 108 to an HPHT sintering process in the presence of a catalyst. A suitable catalyst may include a metal-solvent catalyst including but not limited to, cobalt, nickel, iron; a carbonate catalyst; an alloy of any of the preceding metals; or combinations of the preceding catalysts to facilitate intergrowth between the diamond particles 104 and form the PCD body/table 124 (FIG. 1B) comprising directly bonded-together diamond grains (e.g., exhibiting $sp^3$ bonding) defining interstitial regions with the catalyst disposed within at least a portion of the interstitial regions. In order to effectively sinter the plurality of diamond particles 104 under HPHT conditions, the assembly 100, shown in FIG. 1A, may be placed in a pressure transmitting medium, such as a refractory metal can, graphite structure, pyrophyllite or other pressure transmitting structure, or another suitable container or supporting element. The pressure transmitting medium, including the assembly 100, may be subjected to an HPHT process using an HPHT press at a temperature of at least about 1000° C. (e.g., about 1300° C. to about 1600° C.) and a cell pressure of at least 4 GPa (e.g., about 5 GPa to about 10 GPa, about 7 GPa to about 9 GPa) for a time sufficient to sinter the diamond particles 104 and form a PCD body/table 124 that bonds to the substrate 108. In an embodiment, a PCD body 124 may be formed by sintering diamond particles in an HPHT process without a substrate present. In an embodiment, a PCD body may be formed by sintering diamond particles 104 in the presence of a catalyst not supplied from a substrate, by way of non-limiting example, a powder, a wafer/disc, or a foil.

In the illustrated embodiment FIG. 1B, the PCD body/table 124 is formed by sintering the diamond particles 104 in the presence of the substrate 108 in a first HPHT process. The substrate 108 may include metal-solvent catalyst-cemented tungsten carbide from which metal-solvent catalyst (e.g., cobalt from a cobalt-cemented tungsten carbide substrate) or metal-solvent catalyst alloy (e.g., cobalt alloy) infiltrates into the diamond particles 104 and catalyzes formation of PCD. For example, the substrate 108 may comprise a cemented carbide material, such as a cobalt-cemented tungsten carbide material or another suitable material. For example, nickel, iron, and alloys thereof are other catalysts that may form part of the substrate 108. The substrate 108 may include, without limitation, cemented carbides including titanium carbide, niobium carbide, tantalum carbide, vanadium carbide, and combinations of any of the preceding carbides cemented with iron, nickel, cobalt, or alloys thereof. However, in other embodiments, the substrate 108 may be replaced with a catalyst material disc and/or catalyst particles may be mixed with the diamond particles 104. As discussed above, in other embodiments, the catalyst may be a carbonate catalyst selected from one or more alkali metal carbonates (e.g., one or more carbonates of Li, Na, and K), one or more alkaline earth metal carbonates (e.g., one or more carbonates of Be, Mg, Ca, Sr, and Ba), or combinations of the foregoing. The carbonate catalyst may be partially or substantially completely converted to a corresponding oxide of Li, Na, K, Be, Mg, Ca, Sr, Ba, or combinations after HPHT sintering of the plurality of diamond particles 104.

The diamond particle size distribution of the plurality of diamond particles 104 may exhibit a single mode, or may be a bimodal or greater grain size distribution that may be substantially continuous or discontinuous. In an embodiment, the diamond particles 104 may comprise a relatively larger size and at least one relatively smaller size. As used herein, the phrases “relatively larger” and “relatively smaller” refer to particle sizes (by any suitable method) that differ by at least a factor of two (e.g., 30 μm and 15 μm). According to various embodiments, the diamond particles 104 may include a portion exhibiting a relatively larger average particle size (e.g., 50 μm, 40 μm, 30 μm, 20 μm, 15 μm, 12 μm, 10 μm, 8 μm) and another portion exhibiting at least one relatively smaller average particle size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles 104 may include a portion exhibiting a relatively larger average particle size between about 10 μm and about 40 μm and another portion exhibiting a relatively smaller average particle size between about 1 μm and 4 μm. In some embodiments, the diamond particles 104 may comprise three or more different average particle sizes (e.g., one relatively larger average particle size and two or more relatively smaller average particle sizes), without limitation.

Figure 1C:
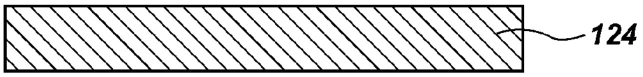
Figure 1D:
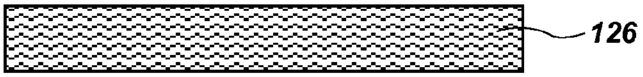

FIG. 1B illustrates a cross-sectional view of a PDC 120 formed by HPHT processing of the assembly 100 shown in FIG. 1A. In such an embodiment, the PCD body/table 124 so-formed may include tungsten and/or tungsten carbide that is swept in with the catalyst from the substrate 108. For example, some tungsten and/or tungsten carbide from the substrate may be dissolved or otherwise transferred by the liquefied catalyst (e.g., cobalt from a cobalt-cemented tungsten carbide substrate) of the substrate 108 that sweeps into the diamond particles 104. The PCD body/table 124 includes a plurality of directly bonded-together diamond grains exhibiting diamond-to-diamond bonding therebetween (e.g., $sp^3$ bonding) defining interstitial regions with the catalyst disposed within at least a portion of the interstitial regions. The interstitial regions may be interconnected allowing material to sweep or diffuse through the PCD table through the interconnected interstitial regions. The PCD body/table 124 also becomes metallurgically bonded to the substrate 108 during HPHT processing of the assembly 100. In an embodiment, the sintered diamond grains of an at least partially leached PCD body 126 (as shown in FIG. 1D) may exhibit an average grain size of about 20 μm or less.

More details about the manner in which the PDC 120 or the PCD body/table 124 may be formed may be found in U.S. Pat. Nos. 7,866,418, 7,998,573, 8,024,136, and 8,236,074 which are incorporated herein, in their entirety, by this reference. U.S. Pat. No. 7,866,418 discloses various embodiments for fabricating PCD and PDCs at ultra-high cell pressures. For example, PCD sintered at a cell pressure of at least about 7.5 GPa may exhibit a coercivity of 115 Oe or more, a high-degree of diamond-to-diamond bonding, a specific magnetic saturation of about 15 $G \cdot cm^3/g$ or less, and a metal-solvent catalyst content of about 7.5 weight % (“wt. %”) or less, such as about 1 wt. % to about 6 wt. %, about 1 wt. % to about 3 wt. %, or about 3 wt. % to about 6 wt. %. Generally, as the sintering cell pressure that is used to form the PCD increases, the coercivity may increase and the magnetic saturation may decrease. The PCD defined collectively by the bonded diamond grains and the catalyst may exhibit a coercivity of about 115 Oe or more and a metal-solvent catalyst content of less than about 7.5 wt. % (e.g., as may be indicated by a specific magnetic saturation of about 15 $G \cdot cm^3/g$ or less). In a more detailed embodiment, the coercivity of the PCD may be about 115 Oe to about 250 Oe and the specific magnetic saturation of the PCD may be greater than 0 $G \cdot cm^3/g$ to about 15 $G \cdot cm^3/g$. In an even more detailed embodiment, the coercivity of the PCD may be about 115 Oe to about 175 Oe and the specific magnetic saturation of the PCD may be about 5 $G \cdot cm^3/g$ to about 15 $G \cdot cm^3/g$. In yet an even more detailed embodiment, the coercivity of the PCD may be about 155 Oe to about 175 Oe and the specific magnetic saturation of the PCD may be about 10 $G \cdot cm^3/g$ to about 15 $G \cdot cm^3/g$. The specific permeability (i.e., the ratio of specific magnetic saturation to coercivity) of the PCD may be about 0.10 or less, such as about 0.060 to about 0.090. Despite the average grain size of the bonded diamond grains being less than about 30 μm in some embodiments, the catalyst content in the PCD may be less than about 7.5 wt. % resulting in a desirable thermal stability.

The PCD body/table 124, shown in FIG. 1B, may be separated from the substrate 108 using a lapping process, a grinding process, wire electrical discharge machining (“wire EDM”), combinations thereof, or another suitable material-removal process. The separated PCD body/table 124, as illustrated in FIG. 1C, may be enclosed in a suitable leaching vessel wherein a leaching agent may be provided that is selected to remove substantially all of the catalyst from the interstitial regions of the separated PCD body/table 124 to form the at least partially leached PCD body 126 substantially as depicted in FIG. 1D. In an embodiment, the leaching vessel/process may be configured to flow or agitate the leaching agent around the PCD body/table 124 with, by way of non-limiting example a stir bar, fluid and/or gas flow inlets and outlets, or an ultrasonic agitator, to form an at least partially leached PCD body 126.

In an embodiment, the PCD body/table 124 and the leaching agent may be placed in the leaching vessel and allowed to soak until such time as the catalyst is leached from the PCD body 124 to a satisfactory depth. In an embodiment, the PCD body/table 124 and the leaching agent may be subjected to elevated temperatures and pressures, thereby causing the catalyst to be leached from the PCD body/table 124. As known in the art, by using elevated pressures and/or temperatures during the leaching process, the time necessary to satisfactorily leach a catalyst from a PCD body may be reduced.

Elevated pressure may be accomplished by utilizing a pressure vessel or any other type of vessel suitable to withstand pressures above ambient pressure. Pressurization may be accomplished by, for example, using a pressure transmitting medium in combination with the pressure vessel, utilizing vapor pressure produced during heating of the leaching agent in a leaching vessel, a standard column of fluid, applying pressure via a pump, or any other suitable method. Elevated pressure may be any pressure above ambient pressure of the environment outside of the leaching vessel.

Elevated temperatures in the leaching vessel may be accomplished in any number ways. For example, using a heating element in combination with the leaching vessel, microwave transmission to the contents of the leaching vessel, induction heating, combinations or the foregoing, or any other suitable method may be used to heat the leaching agent and/or the PCD body. Elevated temperature may be any temperature above ambient temperature, but below the temperature of thermal degradation of the polycrystalline diamond body (i.e., about 700° C. in non-diamond stable conditions). For example, the temperature of the leaching agent may be any temperature near the boiling point of the leaching agent (i.e., the boiling point at the pressure of the leaching agent), any temperature above the boiling point of the leaching agent, or any temperature below 700° C. In an embodiment, both the pressure and the temperature may be controlled in such a manner as to maintain the leaching agent or a component of the leaching agent in a supercritical state.

A leaching agent in a supercritical state may leach a PCD table faster than a conventional leaching agent bath. Leaching agents having a supercritical fluid component in the supercritical state and an aqueous component have many advantages for the removal of metallic infiltrant and catalyst from PCD bodies over conventional leaching agents and processes including enhanced diffusivity, lower viscosity, chemical stability, and/or pressure-dependent solvation properties that may facilitate removal of the catalyst. The supercritical fluid component may also exhibit substantially zero surface tension, which may be beneficial for extraction of metallic infiltrant or catalyst from PCD bodies because the supercritical fluid component may more readily penetrate into the interstitial regions between the bonded diamond grains of the PCD body and facilitate increased mass transfer. These features of supercritical fluid component may be exploited to leach the PCD bodies and PDCs to thereby remove metallic infiltrant or catalyst from the interstitial regions, and to provide for shorter leaching cycles, and faster leaching rates compared to a conventional acid leaching process. Leaching using a supercritical fluid component may be particularly effective for leaching PCD bodies fabricated at ultra-high cell pressures that exhibit a relatively high-degree of diamond-to-diamond bonding as described in U.S. Pat. No. 7,866,418. For example, it is currently believed that employing leaching agents including a supercritical fluid component may improve leaching rates by as much as a factor of about 8 to about 10. Leaching with supercritical agents or leaching agents comprising supercritical components may be carried out under the conditions described above or substantially as any of the conditions described in U.S. Patent Application No. 61/897,764, the disclosure of which is incorporated herein, in its entirety, by this reference.

After at least partially leaching the PCD body, the PCD body 126 may be substantially free of catalyst material. However, not all of the catalyst may be removed and as such the PCD body cannot be referred to as absolutely free of catalyst. For example, substantially free includes situations in which 85 wt. %, 90 wt. %, 95 wt. %, 97 wt. %, 99 wt. %, 99.9 wt. %, or greater than 99 wt. % of the originally present catalyst material has been removed from the leached portion. The resulting at least partially leached PCD body 126 includes a plurality of interstitial regions that were previously occupied by the catalyst and form a network of at least partially interconnected pores that extend between the surfaces of the at least partially leached PCD table 126. The at least partially interconnected pores may enable fluids and/or gases to diffuse into the PCD body 126, and/or from one surface of the PCD body through to another surface of the PCD body.

It is believed that after leaching, leaching agents (e.g., aqua regia) and/or leaching by-products (e.g., cobalt ions, or cobalt salts) may diffuse toward the surface of a PCD body. For example, the leaching agent used to remove cobalt from the interstitial regions may leave one or more residual salts, one or more oxides, complexes, combinations of the foregoing, or another leaching by-product within at least a portion of the interstitial regions of the at least partially leached PCD body/table 126. Depending upon the chemistry of the leaching solution, the leaching by-products may comprise a salt of nitric acid, hydrofluoric acid, hydrochloric acid, phosphoric acid, acetic acid, or mixtures of the foregoing. For example, the salt may be cobalt nitrate or cobalt chloride. The leaching by-products may alternatively or in combination include a metal oxide, such as an oxide of tungsten, cobalt or other metal-solvent catalyst, and/or a hydrated ion or another type of metal present in the catalyst of the at least partially leached PCD body/table prior to leaching. It has been observed that PCD bodies containing leaching by-products exhibit increased difficulty in being bonded to a substrate. For example, leaching by-products may block, obstruct, or otherwise inhibit infiltration of the at least partially leached PCD body/table 126 with a Group VIII infiltrant material (e.g., cobalt). Such leaching by-products may also inhibit back filling with other materials such as silicon or copper. Removing leaching by-products prior to infiltration may provide greater thermal stability by allowing more infiltrant to infiltrate the PCD body.

Conventional PCD table cleaning processes include soaking the at least partially leached PCD body/table 126 in a solution. Conventional removal solutions or agents include de-ionized water. Conventional soaking times for cleaning leaching agents and/or leaching by-products out of a PCD body may be relatively long, ranging from days to weeks. U.S. Pat. No. 7,845,438, which is incorporated herein in its entirety by this reference, discloses various techniques for cleaning leaching by-products from a PCD body.

Figure 1E:
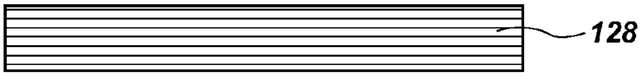
Figure 2A:
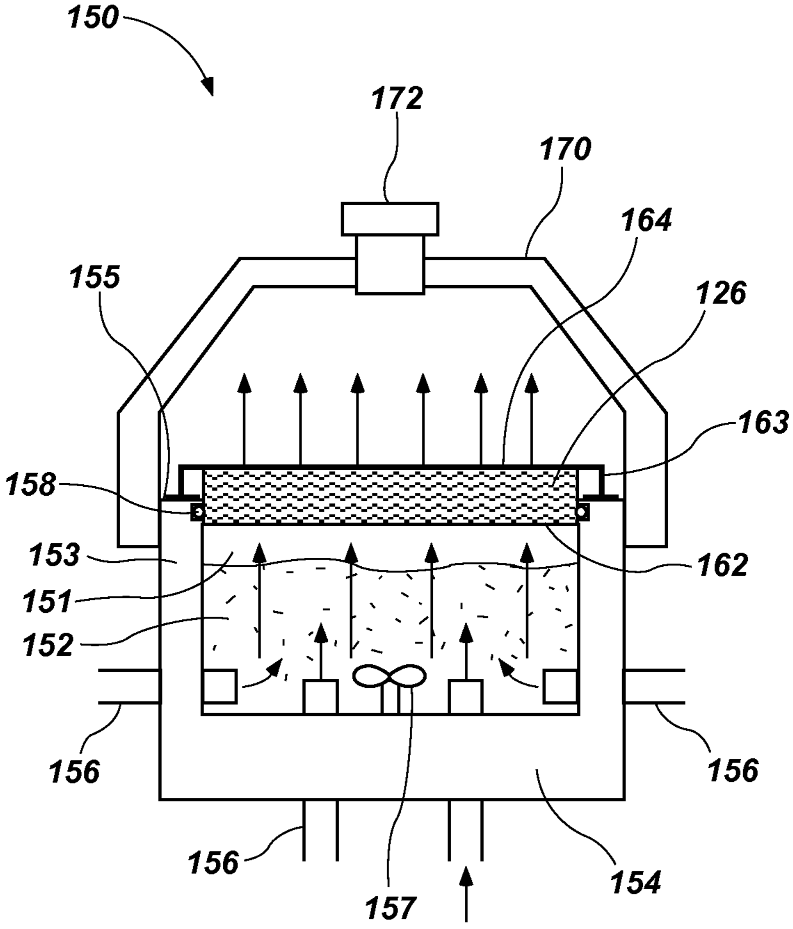
FIG. 2A is a cross-sectional side view of a pressure vessel according to an embodiment.

Referring to FIG. 2A leaching agents and/or leaching agent by-products may be removed/cleaned from the at least partially leached PCD table 126 by subjecting the at least partially leached PCD table 126 to a pressurized removal process described in greater detail below, thereby producing the at least partially leached and cleaned PCD table 128 depicted in FIG. 1E. In an embodiment, the at least partially leached PCD table 126 may be exposed to removal agents 152 at elevated pressures on at least one surface of the at least partially leached PCD table 126. Portions of the at least partially leached PCD table 126 subjected to the elevated pressures may be referred to as the high pressure surfaces 162. In an embodiment, the removal agents 152 may pass through the at least partially leached PCD table 126 from the high pressure surface 162 to a low pressure surface 164 exposed to an ambient or lower outside environment pressure, thereby removing/cleaning the leaching agents and/or leaching by-products from the at least partially leached PCD table 126.

Figure 1F:
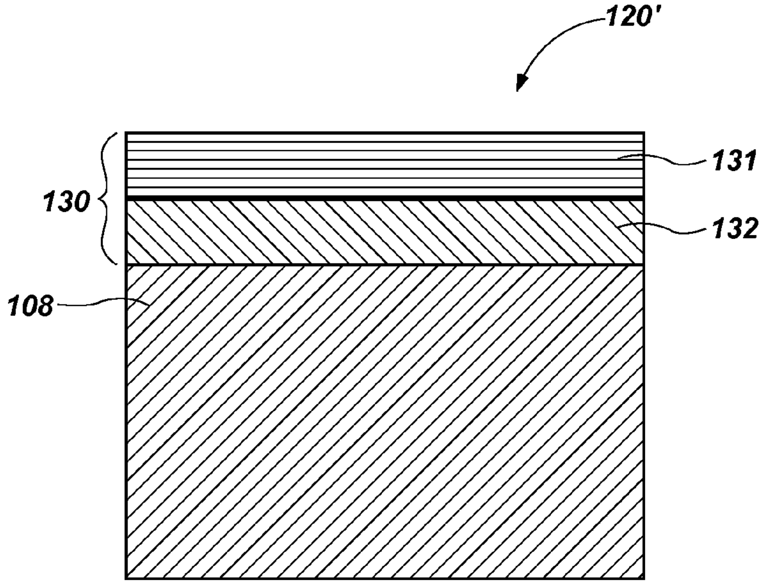

In an embodiment depicted in FIG. 1F, an at least partially leached, cleaned, and infiltrated PCD table 130 may be infiltrated to include at least one region 131 and/or 132, wherein the regions may include a metallic infiltrant such as cobalt, silicon, copper, tin, aluminum, boron, combinations thereof, or any of the other infiltrant materials discussed herein. In an embodiment, the first region 131 may be substantially free of cobalt infiltrant but include another infiltrant (e.g., copper) within the interstitial regions. In an embodiment, the second infiltrated region 132 may be disposed nearest the substrate and include a metallic infiltrant (e.g., cobalt from a cobalt-cemented tungsten carbide substrate such as the substrate 108) in the interstitial regions therein. In other embodiments, the infiltrated PCD table 130 may be fully infiltrated such that the first region 131 also includes the metallic infiltrant therein. When the infiltrated PCD table 130 is partially or fully infiltrated with the metallic infiltrant, the infiltrated PCD table 130 may be at least partially leached to a selected depth from an upper surface to at least partially remove the metallic infiltrant. For example, the selected depth may be greater than about 50 μm, such as about 50 μm to about 800 μm, about 200 μm to about 800 μm, about 400 μm to about 800 μm, or about 250 μm to about 500 μm. In some embodiments, the at least partially leached PCD table 126 may be chamfered so that a chamfer is formed between the upper surface and side surface, or the chamfer may be formed after infiltration of the at least partially leached PCD table 126.

Referring still to FIG. 2A, in an embodiment, the at least partially leached PCD table 126 is cleaned in a pressure vessel 150. The pressure vessel 150 may include a vessel configured hold a pressure above that of an ambient atmospheric pressure, such as being configured to hold pressures in excess of 50 MPa; to contain chemicals including strong acids, strong bases, organic solvents, or combinations thereof; to maintain integrity at elevated temperatures, such as under 700° C.; and combinations of the foregoing. Put another way, the pressure vessel 150 may include a vessel configured to be capable of withstanding conditions necessary to create and/or maintain supercritical fluid states. In an embodiment, the pressure vessel 150 may comprise a stainless steel vessel, or a stainless steel vessel lined with polytetrafluoroethylene (“PTFE”). In an embodiment, the pressure vessel 150 may comprise at least one side wall 153, a back wall 154, and a pressure cap 170, all of which are configured to hold the removal agent 152, maintain structural integrity and/or pressure and heat maintaining capabilities under elevated pressure and/or temperature.

In an embodiment of the pressure vessel 150 shown in FIG. 2A, the at least one side wall 153 is joined to the back wall 154. The pressure cap 170 may optionally include a pressure valve 172. In an embodiment, the least partially leached PCD table 126 may be cleaned by placing the least partially leached PCD table 126 into the pressure vessel 150 with the removal agent 152. The pressure is elevated inside of the pressure vessel 150. In an embodiment, the pressure vessel 150 may include an engaging end 155 defined at least partially by the side wall 153, with the engaging end 155 being disposed generally opposite the back wall 154. The engaging end 155 may be configured to engage and hold the at least partially leached PCD table 126 in place such that it is retained inside of the pressure vessel 150 during the pressurized removal/cleaning methods described herein. The engaging end 155 may be configured to retain the at least partially leached PCD table 126, for example by an interference or compression fit. In an embodiment, the interference fit may be accomplished using at least a single sealing element 158. The sealing element 158 may comprise a gasket, an O-ring, compression seal (ferrule), sleeve, or any other suitable device for providing a seal between two surfaces.

Figure 2B:
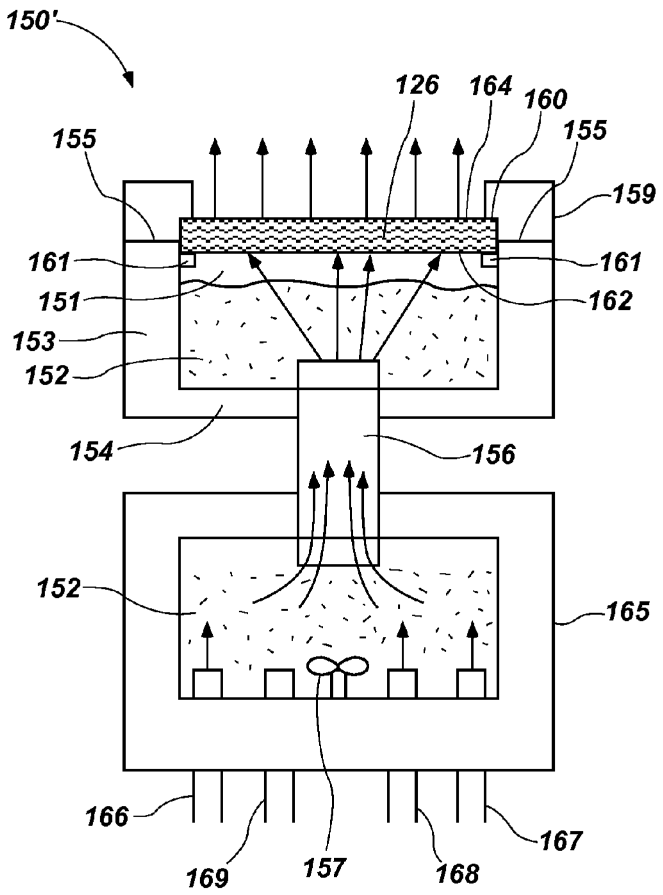
FIG. 2B is a cross-sectional side view of a pressure vessel and removal agent supply according to an embodiment.

In another embodiment depicted in FIG. 2B, the at least partially leached PCD table 126 may be positioned on the engaging end 155 by insertion into a retaining ring 159. The retaining ring 159 may be configured to include at least a single lip 160 in which movement of the at least partially leached PCD table 126 is constrained by at least the at least a single lip 160. The retaining ring 159 may be threaded to attach to a complimentary thread on the at least one single side wall 153. The at least partially leached PCD table 126 may abut a landing 161 inside of the at least one side wall 153. The retaining ring 159 includes threads therein may then be threadedly attached to the at least one side wall 153 having complementary threads to thereby secure the at least partially leached PCD table 126 in place in the pressure vessel 150. In an embodiment, the pressure vessel 150 may be secured to the retaining ring 159 by another mechanical means such as screws, bolts, lock studs, clamps, combinations thereof, or any other means configured to hold two components together.

Referring again to FIG. 2A, in an embodiment, the pressure cap 170 is configured to contain elevated pressures inside of the pressure vessel 150 and release the elevated pressure upon opening the pressure valve 172. It will be understood that in certain embodiments, the pressure cap 170 is not necessary to build the pressures disclosed herein. For example, in an embodiment, elevated pressure may be supplied from an inlet 156, or may be supplied from the interior volume 151 wherein the at least partially leached PCD table 126 holds some of the elevated pressure behind the high pressure surface 162 in the interior volume 151. In an embodiment substantially as depicted in FIG. 2B, elevated pressure may be achieved by sealing (i.e., positioning) at least partially leached PCD table 126 at the engaging end 155 wherein the at least partially leached PCD table 126 seals the pressure vessel 150 at the engaging end 155 by having the same or substantially the same geometry as the engaging end 155 and fitting closely therein such that gases or fluids are not readily lost where the at least partially leached PCD table 126 and engaging end 155 meet. It will be readily understood that the at least partially leached PCD table 126, being at least partially porous through interconnected interstitial spaces, may not hold the pressure inside of the interior volume 151 indefinitely, however, the PCD table will be able to hold the pressure before slowly losing such pressure through migration, flow, or diffusion of gases and/or fluids from the high pressure surface 162 through the interconnected interstitial spaces of the bonded polycrystalline diamond grains to the lower pressure environment outside of the interior volume 151.

The interior volume 151 is defined partially by the at least one side wall 153 joined to the back wall 154. The interior volume 151 may be further defined by the pressure cap 170. In such an embodiment, substantially all of the inside of the pressure vessel 150 may comprise the interior volume 151. In an embodiment, the interior volume 151 may be further defined by at least one surface of the PCD table 126. In such an embodiment, the interior volume 151 may comprise only a portion of the inside of the pressure vessel 150, such as the embodiment depicted in FIG. 2A. The interior volume 151 may include a removal agent 152, elevated pressure, elevated temperature, or combinations thereof. As described in more detail below, the removal agent 152 may comprise, for example, a liquid, a gas, or combinations thereof. The removal agent 152 may be supplied to the interior volume 151 before, substantially contemporaneously with, and/or after the at least partially leached PCD table 126 is positioned on the pressure vessel 150.

In an embodiment, the removal agent 152 may be supplied to the inside of the pressure vessel 150 as an aliquot by a syringe, pipette, flask, beaker, or other chemical dispensing means. In an embodiment depicted in FIG. 2B, the removal agent 152 may be supplied to the inside of the pressure vessel 150', specifically to the interior volume 151, via an inlet 156. The inlet 156 may be configured to deliver at least a single component of the removal agent 152. In an embodiment depicted in FIG. 2A, the pressure vessel 150 may optionally include one or more inlets 156, with the individual inlets configured to deliver individual components of the removal agent 152, pressurization from a pressure source (i.e., a pressure pump (not shown)), a heating system, or combinations thereof. In an embodiment, the pressure vessel 150 may include a heating system 169. The heating system 169 may be positioned internal (as depicted in FIG. 2B) and/or external to the pressure vessel 150.

In an embodiment depicted in FIG. 2B, the pressure vessel 150' may be connected to the inlet 156 and further connected to a removal agent supply 165 configured to supply removal agent 152 into the pressure vessel 150' under the desired conditions, including, but not limited to, removal agent composition, temperature, pressure, and combinations thereof. For example, the removal agent supply 165 may comprise one or more of a supercritical component source 166, a removal agent component source 167, a pressure source 168, the heating system 169, and a stirrer 157. The removal agent component source 167 may be configured to supply one or more of an aqueous component including an acidic component and/or a basic component; an organic solvent component; an inorganic component; and a chelating agent component. The supercritical component source 166 may be configured to deliver a fluid or gas capable of being manipulated into the supercritical fluid state by control of pressure and temperature conditions. By way of non-limiting example, de-ionized water and carbon dioxide are suitable supercritical components for the removal agent 152. As depicted in FIG. 2A, the pressure vessel 150 may have multiple inlets 156, the multiple inlets 156 configured to individually deliver substantially the same components described above regarding the removal agent supply 165.

The heating system 169 may include one or more heating elements, a dielectric heat source such as a microwave or radio wave emitter, or one or more induction heating elements. The pressure source 168 may provide pressure to the removal agent supply 165 and/or the pressure vessel 150 by via a pressure pump, or a pressure transmitting medium in the pressure vessel 150.

Figure 2C:
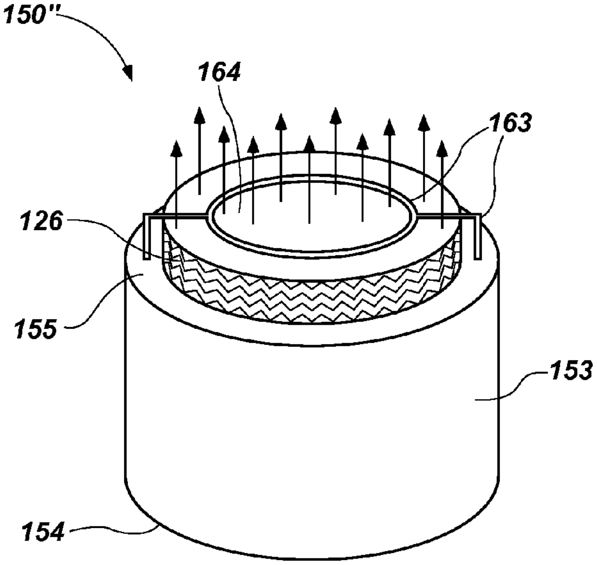
FIG. 2C is an isometric view of a pressure vessel according to an embodiment.

In an embodiment, the pressure vessel 150" may comprise a retaining feature 163 as shown in FIG. 2C which attaches to the pressure vessel 150" near the engaging end 155 and holds the PCD body 124 in place. The retaining feature 163 may be configured to prevent the PCD table from losing its position during pressurized cleaning and/or to provide support to the PCD table 124 during pressurized cleaning. In an embodiment, the retaining feature may resemble a wire cage over the low pressure surface 164 attached to the pressure vessel 150".

In an embodiment, a suitable vessel for cleaning may comprise a tray having multiple pressure vessels, substantially similar to any described above, formed or disposed therein, wherein cleaning PCD bodies under pressurized conditions may be performed in batches.

Figure 3A:
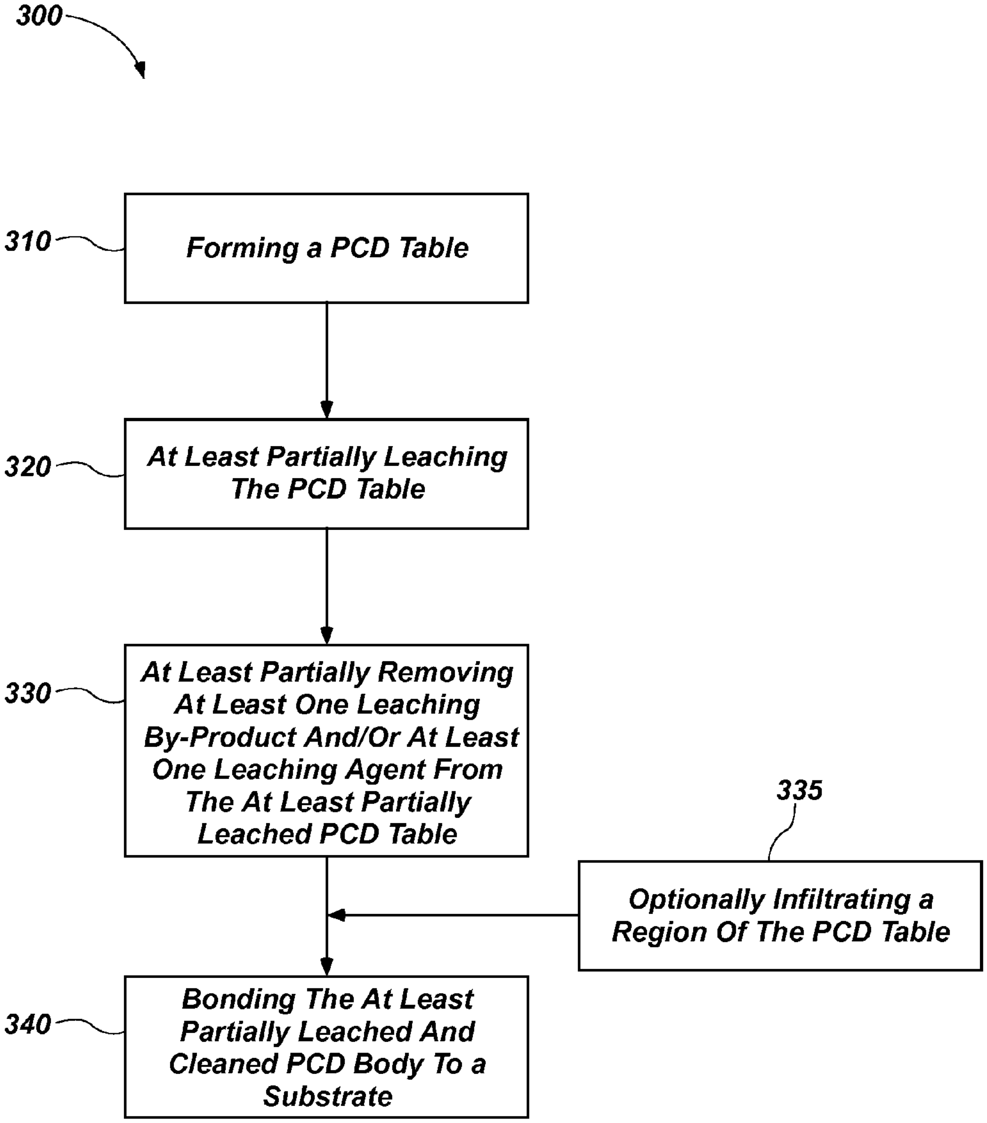
FIG. 3A is a flow diagram of a method of making a PDC according to an embodiment.

FIG. 3A is a flow diagram of a method 300 of making a PDC according to an embodiment, the method 300 includes an act 310 of forming a PCD table 124 in substantially any manner described above. Following the act 310 of forming a PCD table, an act 320 of at least partially leaching the PCD table is carried out in substantially the same manner as any of the leaching methods describe above. Next, an act 330 of at least partially removing at least one leaching by-product and/or at least one leaching agent from the at least partially leached PCD table to clean the at least partially leached PCD table is performed in a pressure vessel at an elevated pressure and/or temperature. Optionally, and as detailed more below, an act 335 of infiltrating the at least partially leached and cleaned PCD table may be carried out after the act 330 of at least partially removing at least one leaching by-product and/or at least one leaching agent from the at least partially leached PCD table. For example, the PCD table 124 may be infiltrated with an infiltrant during HPHT bonding of the PCD table 128 to the substrate 108, or in a separate HPHT or non-HPHT process. Following the act 330 of at least partially removing at least one leaching by-product and/or at least one leaching agent from the at least partially leached PCD table, a PDC may be formed via the act 340 of bonding the at least partially leached and cleaned PCD table to a substrate.

Figure 3B:
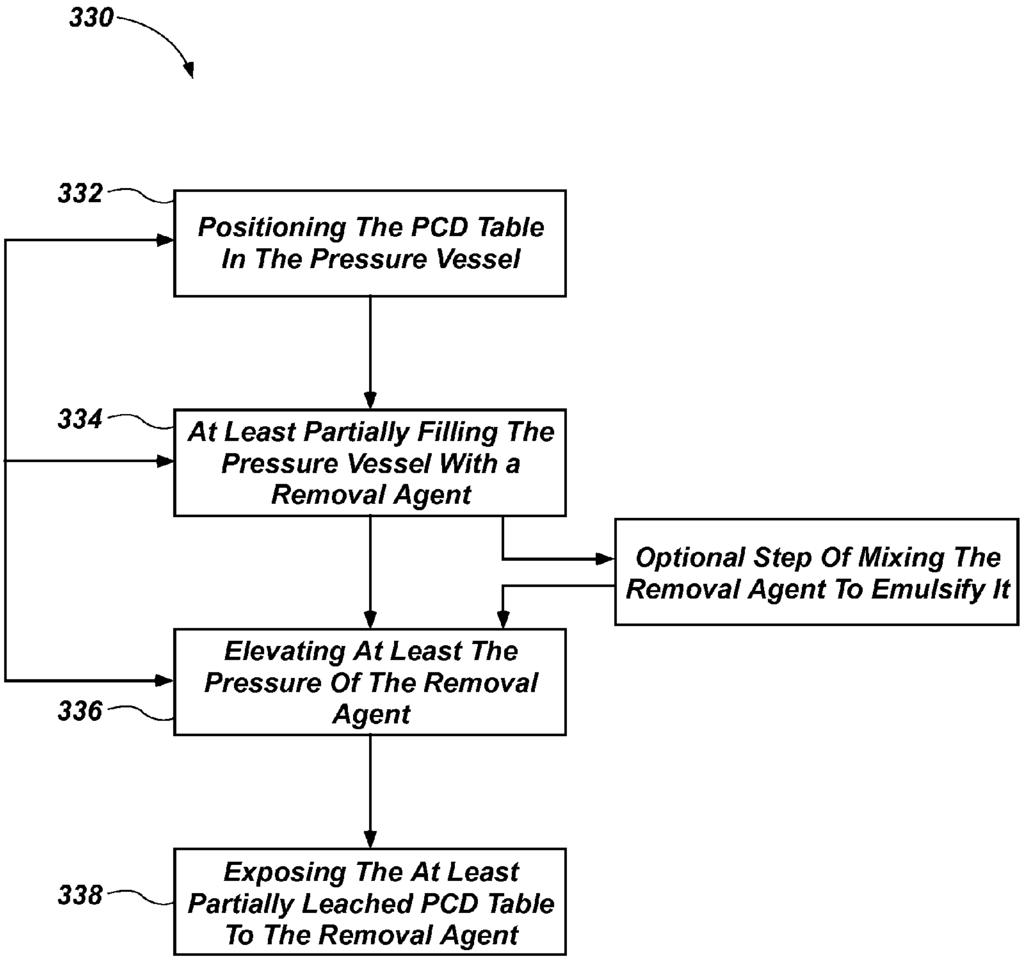
FIG. 3B is a flow diagram of a method of cleaning a PCD according to an embodiment.

FIG. 3B is a flow diagram of an embodiment of a method 330 of at least partially removing at least one leaching by-product and/or at least one leaching agent from the at least partially leached PCD table to clean the at least partially leached PCD table including an act 332 of positioning a PCD body in a pressure vessel, wherein an act 334 of at least partially filling the pressure vessel with a removal agent is carried out. Referring to FIGS. 2A-2C as it relates to FIG. 3B, an act 336 of elevating at least the pressure of the removal agent includes elevating the pressure of the removal agent either in the pressure vessel 150 or in a removal agent supply 165. An act 338 of exposing the at least partially leached PCD table to the removal agent may include diffusing the removal agent through the PCD body which further includes flowing the removal agent 152 into the PCD table and/or through the PCD table from the high pressure surface 162 (FIG. 2A) to the low pressure surface 164 (FIG. 2A), thereby sweeping or cleaning out any leaching agents or leaching agent by-products in the at least partially leached PCD table 126.

In an embodiment, the act 332 of positioning a PCD table in a pressure vessel includes, placing the PCD body 126 into the pressure vessel. In an embodiment, the act 332 of positioning a PCD table in a pressure vessel includes, placing the PCD table 126 in the pressure vessel and sealing the interior volume of the pressure vessel from the environment outside of the pressure vessel. Also with reference to FIG. 2A, in an embodiment, the act 332 of positioning a PCD table in a pressure vessel includes placing the at least partially leached PCD table 126 in the pressure vessel 150 such that at least one surface of the at least partially leached PCD table 126 is exposed to the removal agent within the pressure vessel 150. In an embodiment, the act 332 of positioning a PCD table in a pressure vessel includes, placing the at least partially leached PCD body 126 into the pressure vessel 150 such that all of the surfaces of the at least partially leached PCD table 126 are exposed to the removal agent within the pressure vessel 150.

In an embodiment, the act 332 of positioning a PCD table in a pressure vessel includes, placing the at least partially leached PCD table 126 into the pressure vessel such that the at least partially leached PCD table 126 encloses or otherwise seals a portion of the pressure vessel 150, thereby creating an interior volume 151. In embodiments, the act 332 of positioning a PCD table in a pressure vessel 150 includes, positioning the at least partially leached PCD table 126 inside of the pressure vessel 150 such that the PCD table includes one or more high pressure surfaces 162 exposed to the environment inside of the pressure vessel 150 (e.g., a removal agent therein). The act 332 of positioning a PCD table in a pressure vessel 150 may include, positioning the at least partially leached PCD table 126 in the pressure vessel 150 such that the PCD table includes one or more low pressure surfaces 164 (FIG. 2A) exposed to an environment outside of the pressure vessel 150. In an embodiment, the act 332 of positioning a PCD table in a pressure vessel 150 includes, positioning the at least partially leached PCD table 126 in a pressure vessel 150 such that the PCD table comprises both of one or more high pressure surfaces 162 (FIG. 2A) exposed to the environment inside of the pressure vessel 150 (including removal agent(s) therein) and one or more low pressure surfaces 164 (FIG. 2A) exposed to the environment outside of the pressure vessel 150. The at least partially leached PCD table 126 may be positioned in the pressure vessel 150 such that pressure exerted from the interior volume 151 on the high pressure surface 162 (FIG. 2A) of at least partially leached PCD table 126 will not dislodge the at least partially leached PCD table 126 from the pressure vessel 150. In an embodiment, the act 332 of positioning the PCD body in the pressure vessel includes, fitting the at least partially leached PCD table 126 into the engaging end 155 by tension fit, thereby securing the PCD table in place. In an embodiment, at least a single sealing element 158 may be used to create tension to hold the PCD body in place during the pressurized cleaning methods disclosed herein. In an embodiment, press fitting includes pressing the PCD body into the pressure vessel 150 by hand, by using a mallet or hammer, by other mechanical means, or combinations of the foregoing. Press fitting may be accomplished using any pressing technique, by way of non-limiting example, an arbor press, a pneumatic press, a hydraulic press, or combinations thereof.

The act 332 of positioning a PCD body in a pressure vessel may include attaching a retaining feature 163 to the pressure vessel 150, wherein the retaining feature 163 is positioned adjacent to and contacts the at least partially leached PCD table 126 on at least a single point to hold the PCD table 124 in place from the outside or low pressure surface 164.

In an embodiment, the act 332 of positioning a PCD table includes placing the PCD body 126 on the landing 161 of the at least one side wall 153 (as shown in FIG. 2B), and connecting a retaining ring 159 including the lip 160 and threading or attachment means complementary to that of the side walls 153 to the at last one side wall 153. Accordingly, the at least partially leached PCD table 126 may be held in place during cleaning by at least the forces applied to the PCD body by the lip 160 and the landing 161. The retaining ring 159 may be held in place on the pressure vessel 150 by fasteners, including but not limited to bolts, screws, lock studs, or clamps. In an embodiment, the at least partially leached PCD table 126 is placed on the lip 160 of the retaining ring 159 which may then be attached to the pressure vessel 150 as described above, such that the PCD table engages the landing 161 on the side wall 153, thereby fixing the position of the at least partially leached PCD table 126 in place. Optionally, the sealing element 158 (e.g., O-ring, gasket, compression seal, other seal element, or combinations thereof) may be used between the PCD table 126 and the landing 161. In an embodiment, the retaining ring 159 and/or features of the retaining ring 159 may be integrally formed or otherwise disposed on the pressure cap 170 shown in FIG. 2A.

In an embodiment, the act 334 of at least partially filling the pressure vessel with a removal agent includes, placing or otherwise supplying at least a single component of a removal agent 152 into the inside of the pressure vessel 150. In an embodiment, the act 334 of at least partially filling the pressure vessel with a removal agent includes, supplying a removal agent 152 in interior volume 151 of the pressure vessel 150. In embodiments, suitable removal agents 152 may comprise one or more components and/or one or more concentrations of components. Suitable removal agent components may include those configured to dissolve or otherwise remove the leaching agents and/or leaching by-products remaining in an at least partially leached PCD table 126 after leaching. Suitable removal agent components may include aqueous components, for example, acidic or basic solutions; organic solvents; chelating agents; a supercritical component including at least one of water or carbon dioxide; or combinations thereof. Removal agents may include any of the leaching agents and/or components of leaching agents described herein. Similar to those described above for leaching agents, components of removal agents 152 may be configured to react with, dissolve, or otherwise dispose of the leaching agents and/or leaching agent by-products left in the at least partially leached PCD table 126. For example, if it is desired that the removal agent 152 dissolve and/or sweep out residual leaching by-products in an at least partially leached PCD table, an aqueous component and/or supercritical water or carbon dioxide may be used. The aqueous component functions to dissolve and/or sweep out the leaching agents and/or by-products of leaching agents including salts of leaching agents and metallic infiltrants or catalysts in solution as metal ions (e.g., cobalt ions). The aqueous component may include, by way of non-limiting example, water (e.g., deionized water), hydrofluoric acid, nitric acid, hydrochloric acid, aqua regia, phosphoric acid, potassium permanganate, a sodium hydroxide solution, a potassium hydroxide solution, a lithium hydroxide solution, or combinations thereof. When present, the chelating component, may function to encapsulate the metal ions, which ordinarily are not very soluble in the supercritical fluid component, into the supercritical fluid component. In an embodiment, the supercritical fluid component functions to dissolve; carry aqueous, organic, or chelating components to; and/or sweep out any leaching agents and/or leaching agent by-products remaining in the at least partially leached PCD table 126 after leaching. The supercritical fluid component may include carbon dioxide, water, organic fluids, or combinations thereof. In an embodiment, the supercritical fluid component may be combined with an organic solvent, such as, by way of non-limiting example, methane, ethane, propane, ethylene, propylene, methanol, ethanol, acetone, pentane, butane, sulfur hexafluoride, xenon dichlorodifluoromethane, trifluoromethane, isopropanol, nitrous oxide, ammonia, methylamine, diethyl ether, or combinations thereof.

According to various embodiments, the aqueous component may comprise about 5 wt. % to about 100 wt. % (e.g., about 10 wt. % to about 30 wt. %, about 15 wt. % to about 20 wt. %, about 30 wt. % to about 95 wt. %), the supercritical component may comprise about 5 wt. % to about 100 wt. % (e.g., about 10 wt. % to about 30 wt. %, about 15 wt. % to about 20 wt. %, about 30 wt. % to about 100 wt. %), and the optional chelating agent may comprise about 5 wt. % to about 60 wt. % (e.g., about 10 wt. % to about 30 wt. %, about 15 wt. % to about 20 wt. %, about 30 wt. % to about 60 wt. %) of the removal agent 152. The removal agent 152 may comprise any combination of any of the aqueous components, supercritical components, and chelating agents disclosed herein along with any combination of the weight percent ranges disclosed above. While removal agents may comprise components capable of being placed in a supercritical state (i.e., supercritical components) during the processes described herein, it is understood that in embodiments, the supercritical component does not have to be placed in a supercritical state for the cleaning/removal processes describe herein to effectively remove leaching by-products from a PCD table. For example, a removal agent comprising a component capable of being placed in a supercritical state may effectively clean the leaching by-products from a PCD body under elevated pressure and optionally elevated temperature short of the supercritical pressure and temperature of that component.

As discussed above regarding leaching agents, in order to facilitate the solubility of the metal ions from the metallic infiltrant or catalyst in the leaching agent by-product, a surfactant may be added to the removal agent to form an emulsion or microemulsion supercritical fluid. The resulting microemulsion exhibiting polar metal or catalyst ions in water cores substantially disperses in the supercritical fluid component making the emulsion supercritical fluid an effective medium for the removal of metallic infiltrant or catalyst bound in leaching agent by-product from PCD bodies. For example, in some embodiments, the removal agent 152 may include a chelating component (e.g., an amphiphilic surfactant) in addition to the supercritical fluid component and the aqueous component. For example, the chelating component may include at least one of an organic solvent, sodium bis-(2-ethylhexyl)sulfosuccinate, a fluorinated sodium bis-(2-ethylhexyl)sulfosuccinate, a perfluoropolyether phosphate, a surfactant including a fluorocarbon tail, or a surfactant including a low density of polarizability. In a more specific embodiment, the removal agent 152 includes a microemulsion of supercritical carbon dioxide, water, sodium bis-(2-ethylhexyl)sulfosuccinate, and perfluoropolyether phosphate. In an embodiment, when the supercritical fluid component is supercritical water, the removal agent 152 may be substantially free of the chelating agent as the leaching agent by-products may be soluble in water and metal ions are soluble in the supercritical water.

In an embodiment, the removal agent 152 may be prepared by stirring or mixing the components, before, during, and/or after the act 334 of at least partially filling the pressure vessel. For example, in an embodiment, a supercritical fluid component and the chelating component may be stirred or mixed sufficiently to form an emulsion, for example by a stirrer 157 disposed in the pressure vessel 150 or removal agent supply 165 substantially as depicted in FIGS. 2A and 2B. Emulsification may occur following a period of stirring. For example, emulsification may occur following stirring for a time of less than about 2 hours, less than about 1.5 hours, from about 15 minutes to about 1 hour, from about 20 minutes to about 40 minutes, from about 25 to about 35 minutes, or for greater than 20 minutes. The stirring of the supercritical fluid component and the chelating component may provide for a substantially homogeneously dispersed emulsion.

In an embodiment, the act 334 of at least partially filling the pressure vessel with a removal agent includes placing at least one component of the removal agent 152 into the pressure vessel 150 before the act 332 of positioning the PCD table in the pressure vessel. In an embodiment, placing at least one component of a removal agent 152 into the pressure vessel 150 may comprise one or more of placing the at least one removal agent component into the vessel via a dispensing means including but not limited to pipetting, pouring, pumping, opening a valve, and inputting commands into a computer controlled dispensing apparatus. In an embodiment, the act 334 of at least partially filling the pressure vessel with a removal agent includes placing at least one component of a removal agent 152 into the pressure vessel 150 substantially contemporaneous with the act 332 of positioning the PCD table in the pressure vessel 150. In an embodiment, at least one component of a removal agent 152 may be placed into the pressure vessel substantially contemporaneous with the act of positioning 332, by at least partially filling the pressure vessel 150 with at least one component of a removal agent 152 from at least a single inlet 156, during or very near in time to the act of positioning 332 as described above. In an embodiment, the act 334 of at least partially filling the pressure vessel with the removal agent includes placing at least one component of the removal agent 152 into the pressure vessel 150 after the act 332 of positioning the PCD table in the pressure vessel. This may be accomplished using the inlet 156 depicted in FIGS. 2A and 2B.

In an embodiment, the act 334 of at least partially filling the pressure vessel with a removal agent includes, at least partially filling the pressure vessel using at least one inlet 156. In an embodiment substantially as depicted in FIG. 2B, the inlet 156 may supply the removal agent 152 including all of the removal agent components to the pressure vessel 150. In an embodiment substantially as depicted in FIG. 2A, more than one inlet 156 may supply individual components of the removal agent 152. For example, in an embodiment, the act 334 of at least partially filling the pressure vessel with a removal agent includes filling the pressure vessel 150 with a removal agent 152 by adding individual removal components into the pressure vessel through separate inlets 156. In an embodiment, more removal agent may be added during cleaning via at least a single inlet 156. In an embodiment, the act 334 includes adding and/or adjusting the component mixture of a removal agent in-situ by adding at least a single removal agent component while the at least partially leached PCD table 126 is being placed in the pressure vessel 150 and/or diffused through the at least partially leached PCD table 126 in act 338 described below. Adding or adjusting the component mixture of the removal agent in-situ may include adding at least a single component of the removal agent 152 after the pressure vessel 150 has been substantially sealed. By way of non-limiting example, the removal agent 152 may be adjusted in-situ based on criteria including but not limited to removal agent composition, time, pressure, and temperature. In an embodiment, the removal agent 152 may be adjusted from acidic or basic to neutral based elapsed cleaning time; from neutral to acidic or basic over a period based on elapsed cleaning time, temperature, pressure or combinations thereof; adjusted to contain a chelating agent or organic solvent only after certain conditions are met; or combinations of the foregoing. Combinations of and criteria for adjusting any of the removal agent components described herein are contemplated and may be used in adding to or adjusting the removal agent according to the methods described herein.

The act 330 of removing at least one leaching by-product or at least one leaching agent from the at least partially leached PCD table further includes an act 336 of elevating at least a pressure of the removal agent. In an embodiment, the pressure of the removal agent may be elevated inside of the pressure vessel 150 to facilitate diffusion of the removal agent 152 into the at least partially leached PCD table 126. In an embodiment, the pressure on a removal agent may be elevated in the interior volume 151 of the pressure vessel 150 to facilitate diffusing the removal agent 152 from the high pressure surface 162 to the low pressure surface 164 of the at least partially leached PCD table 126, substantially as depicted in FIGS. 2A-2C. In an embodiment, the act 336 of elevating at least a pressure of the removal agent comprises using a pressure pump to elevate the pressure inside of the pressure vessel 152. Using a pressure pump may include pumping at least one removal agent component into the sealed pressure vessel 150 above the ambient pressure of the environment outside of the pressure vessel, thereby raising the pressure inside of the pressure vessel. In an embodiment, removing a leaching agent from a PCD body may include, elevating the pressure inside of a pressure vessel having acid and an at least partially leached PCD table disposed therein. In an embodiment, removing a leaching agent from a PCD body may include, elevating the pressure inside of a pressure vessel 150 having caustic soda and an at least partially leached PCD table disposed therein.

In an embodiment, suitable pressures of the removal agent 152 generated by the pressure vessel 150 may include pressures of less than about 50 MPa, about 45 MPa, about 25 MPa, about 22.5 MPa, about 20 MPa, about 15 MPa, about 10 MPa, about 7.5 MPa, about 5 MPa, about 1 MPa, or above about 0.105 MPa. In an embodiment, suitable ranges of pressures may include pressures of less than about 50 MPa to pressures slightly above ambient pressure (i.e., about 0.105 MPA), about 35 MPa to about 7.5 MPa, about 25 MPa to about 15 MPa, or about 20 MPa to about 22.5 MPa.

In an embodiment, the act 336 of elevating at least a pressure of the removal agent includes elevating the temperature of at least a single component of the removal agent 152 inside of a substantially sealed pressure vessel, thereby inducing heightened vapor pressure. In an embodiment, elevating the pressure of the removal agent inside of the pressure vessel may be accomplished by heating the contents of the pressure vessel 150, including a removal agent 152, with a heating element 169 disposed inside and/or outside of the pressure vessel 150. In an embodiment, the act 336 may include placing the pressure vessel in a kiln, oven, or a heated bath, such as a salt bath. In an embodiment, the act 336 of elevating at least a pressure of the removal agent includes heating the pressure vessel and/or the contents of the pressure vessel with a dielectric heat source such as a microwave or radio wave emitter to induce heightened vapor pressure therein. In an embodiment, the act 336 of elevating the pressure of the removal agent includes heating an acid or a base disposed in a pressure vessel to induced elevated vapor pressure in the pressure vessel to diffuse the acid or base into a PCD table.

Suitable cleaning temperatures may include temperatures above ambient temperature and below about 700° C. Suitable temperatures may include about 650° C., about 500° C., about 400° C., about 300° C., about 200° C., about 100° C., and about 40° C. Suitable ranges may include about 350° C. to about 400° C., about 250° C. to about 500° C., about 150° C. to about 600° C., and about 30° C. to about 700° C.

In an embodiment, the act 336 of elevating at least the pressure of the removal agent includes, elevating both of the pressure and temperature of the removal agent 152 such that the supercritical component in the removal agent 152 enters a supercritical state. In an embodiment, carbon dioxide may be a removal agent component, wherein the carbon dioxide may be subjected to pressure above about 7.3 MPa and temperature above about 31° C. thereby bringing the carbon dioxide to a supercritical state. In an embodiment, de-ionized water may be a removal agent component, wherein the de-ionized water may be subjected to pressure above about 22.1 MPa and temperature above about 374° C. to bring the water to a supercritical state. Any of the techniques suitable for elevating the temperature and/or pressure of the contents of the pressure vessel, including but not limited to those described above, may be used to bring a removal agent component to its supercritical fluid state. Cleaning the at least partially leached PCD table 126 with supercritical fluid has many advantages for the at least partial removal of leaching agents and leaching by-products including the catalyst from PCD bodies over soaking in a solution including enhanced diffusivity, lower viscosity, chemical stability, and pressure-dependent solvation properties that facilitate removal of the leaching agents and leaching by-products including any catalyst material present. The supercritical fluid component may also exhibit substantially zero surface tension, which is beneficial for cleaning PCD bodies because the supercritical fluid component may more readily penetrate into the interstitial regions between the bonded diamond grains of the PCD body. Accordingly, the removal agent having the supercritical component in the supercritical state may more quickly and effectively diffuse through the PCD body, or from high pressure to low pressure through a PCD body, thereby cleaning, dissolving, and/or sweeping leaching agents and leaching by-products from the PCD body. Further, as noted above regarding leaching agents, an emulsified removal agent having a component in a supercritical fluid state may more effectively carry removal agent components capable of dissolving leaching agents and or leaching by-products into the interstitial regions between the bonded diamonds.

It will be readily understood that depending on the pressure vessel used, the pressure of the removal agent may be elevated before the removal agent is introduced into the pressure vessel 150. Therefore, acts 332, 334, and 336 may be carried out in a different order than depicted in FIG. 3B, depending on the desired effects and the type of pressure vessel used. In an embodiment the act 336 of elevating at least the pressure of the removal agent may be carried out before positioning the PCD table in the pressure vessel and/or before the act 334 of at least partially filling the pressure vessel with the removal agent.

In an embodiment, the act 330 of removing at least one leaching by-product or at least one leaching agent from the at least partially leached PCD table may further include the act 338 of exposing the polycrystalline diamond table to the removal agent (e.g., diffusing the removal agent through the PCD body). In an embodiment, the removal agent 152 disposed in the sealed pressure vessel 150 under pressurized conditions, diffuses into the interstitial regions between bonded diamond grains of the at least partially leached PCD table 126. In an embodiment, the removal agent 152 is allowed to diffuse, flow, or otherwise migrate from high pressure in the interior volume 151 to lower pressure outside of the interior volume. The removal agent 152 may diffuse from the high pressure surface 162 to the low pressure surface 164 dissolving, sweeping or otherwise disposing of the leaching agents and/or leaching by-products remaining in the partially leached PCD body 126. In an embodiment, the leaching agent 150 may diffuse through the PCD table 124 in one or more of a gas phase, a liquid phase, and a supercritical phase.

In an embodiment, the pressure cap 170, as shown in FIG. 2A, may be used in part to create elevated pressure in the pressure vessel 150 or more specifically in the interior volume 151. In an embodiment, once a desire pressure is reached, the pressure valve 172 on the pressure cap 170 may be opened to allow the low pressure surface 164 to be exposed to the lower pressure outside of the pressure vessel 150. Accordingly, the contents of the interior volume 151 including a removal agent 152 would diffuse, flow, or otherwise migrate from the elevated pressure remaining in the interior volume 151 through the at least partially connected interstitial regions between diamond grains in the at least partially leached PCD table 126 to the lower outside environment pressure at the lower pressure surface 164, thereby dissolving, sweeping, and/or otherwise disposing of leaching agents and/or leaching by-products in the PCD body 124.

In embodiments, the act 338 of exposing the at least partially leached PCD table 128 to the removal agent may comprise diffusing the removal agent through a PCD body which may further include diffusing the removal agent through a PCD body for different durations. In an embodiment, the pressurized removal agent 152 may diffuse through the PCD body for about 24 hours. In an embodiment, the pressurized removal agent 152 may diffuse or flow through the PCD body for about 20 hours, about 16 hours, about 12 hours, about 8 hours, about 4 hours, or for about 2 hours. In an embodiment, ranges of cleaning durations may include about 1 hour to about 24 hours, about 2 hours to about 20 hours, about 4 hours to about 16 hours, or about 8 hours to about 12 hours.

It will be readily recognized that depending on many conditions including, but not limited to, the pressure exerted from the interior volume 151 including the removal agent 152; the type, composition, and concentration of the removal agent components; the thickness of the PCD body, and/or the size and extent of interconnectivity of the interstitial regions between the bonded diamond grains of the at least partially leached PCD table 126; different rates of flow or diffusion through the PCD body 120 may be achieved. For example, in an embodiment, the PCD table 124 made using larger diamond particles 104 may have larger interstitial spaces between bonded diamond grains and may allow for a faster diffusion or flow of removal agent 152 through said interstitial spaces than a PCD table made using smaller diamond grains. Accordingly, in an embodiment, different PCD table manufacturing conditions including but not limited to diamond particle size, HPHT conditions, leaching agent composition, leaching conditions, removal agent composition, and cleaning conditions may be manipulated to effect (i.e., adjust from faster to slower, or vice versa) the rate of flow of removal agent through the at least partially leached PCD table 126.

The act 330 of at least partially removing at least one leaching by-product or at least one leaching agent from the at least partially leached PCD body 126 may be repeated using the same or different removal agents, the same or different temperatures, the same or different pressures, the same or different durations, and combinations thereof.

Referring back to FIG. 3A, after the act 330 of removing at least one leaching by-product or at least one leaching agent from the at least partially leached PCD table, the at least partially leached and cleaned PCD table may optionally be infiltrated in act 335 with an infiltrant. Suitable infiltrants may include Group VIII infiltrants such as those discussed above; non-Group VIII infiltrants such as by way of non-limiting example, boron, copper, gold, silver, aluminum, tin, antimony, silicon, silicone, carbon, titanium, vanadium, chromium, manganese, niobium, technetium, hafnium, tantalum, tungsten, rhenium, magnesium, lithium, zinc, germanium, gallium, antimony, bismuth, gadolinium, thallium, indium, cadmium, combinations of the foregoing; or any other materials configured to provide increased thermal and/or mechanical stability to the at least partially leached and cleaned PCD table 128. An infiltrant may be provided in the form of a powder, foil, disc, from a substrate 108, or combinations of any of the foregoing. In an embodiment, the at least partially leached and cleaned PCD body 128 may be infiltrated with an infiltrant during a second HPHT process for attaching/bonding the PCD body 128 to a substrate 108 in a manner substantially similar to the HPHT processes described above. In another embodiment, the at least partially leached and cleaned PCD body 128 may be infiltrated with infiltrant during a second HPHT process without the presence of a substrate 108. During an HPHT process, an infiltrant may melt and sweep into the empty interstitial spaces of an at least partially leached and cleaned PCD body 128, from a surface thereof. In an embodiment, the temperature used in the second HPHT process is below that of the HPHT temperature used to form the PCD body 124 as described above, but above that of the melting temperature of the infiltrant material. In an embodiment, suitable HPHT infiltration pressures include 4 to 8 GPa, and infiltration temperatures include about 500° C. to about 1500° C. In an embodiment, a PCD body is infiltrated with an infiltrant by placing the at least partially leached and cleaned PCD body 128 in contact with an infiltrant material and subjecting the PCD body and infiltrant material to an HPHT process substantially as described above. In an embodiment, a metal foil (e.g., copper) may be placed on the upper surface of an at least partially leached and cleaned PCD body, wherein during a second HPHT process, the copper melts and infiltrates into the at least partially empty pores spaces between polycrystalline diamond grains. In an embodiment, a substrate comprising a metallic infiltrant may be placed under an at least partially leached and cleaned PCD body 128, wherein during a second HPHT process, the metallic infiltrant in the substrate 108 melts and infiltrates into the at least partially empty pores spaces between polycrystalline diamond grains of the PCD body 128. An infiltrant may be provided in an amount sufficient to, or infiltrated by conditions suitable to, limit infiltration of the infiltrant to a specific region of the at least partially leached and cleaned PCD body. For example, an infiltrant provided from the substrate may infiltrate only into the region 132 depicted in FIG. 1F, or an infiltrant provided at the upper surfaced of the PCD table may be infiltrated only into region 131 depicted in FIG. 1F. In an embodiment, substantially the entire PCD table may be infiltrated by one or more infiltrants. In an embodiment, an at least partially leached and cleaned PCD body 128 is infiltrated from both the upper surface from a powder, foil, or disc, and below the PCD table from the substrate.

Referring back to FIG. 3A, the act 340 of bonding an at least partially leached and cleaned PCD body to a substrate includes joining the PCD body to a substrate in a second HPHT process, substantially similar to the HPHT process described above. In an embodiment of the act 340, the at least partially leached and cleaned PCD body 128 and substrate 108 may be placed in a pressure transmitting medium, such as a refractory metal can, graphite structure, pyrophyllite or other pressure transmitting structure, or another suitable container or supporting element. The pressure transmitting medium, including the assembly, may be subjected to a second HPHT process using an HPHT press at a temperature of at least about 1000° C. (e.g., about 1300° C. to about 1600° C.) and a cell pressure of at least 4 GPa (e.g., about 5 GPa to about 10 GPa, about 7 GPa to about 9 GPa) for a time sufficient to bond the at least partially leached and cleaned PCD body 128 to the substrate 108 and form a PDC 120' as shown in FIG. 1F. The HPHT process bonds the at least partially leached and cleaned PCD body/table 128 to the substrate 108 and may cause metallic infiltrant from the substrate 108 or another source to infiltrate the interstitial regions of the at least partially leached and cleaned PCD body/table 128 to produce an at least partially leached, cleaned and infiltrated PCD table 130. The HPHT temperature may be sufficient to melt at least one constituent of the substrate 108 (e.g., cobalt, nickel, iron, alloys thereof, or another constituent) that infiltrates the at least partially leached and cleaned PCD body 128. The PDC 120' so-formed includes an infiltrated PCD body 130 in which the interstitial regions thereof are at least partially filled with the metallic infiltrant from the substrate 108 thereby forming an infiltrated region 132 on the infiltrated PCD body 130. In an embodiment, the second infiltrated region 132 may be disposed nearest the substrate and include metallic infiltrant such cobalt in the interstitial regions therein. In an embodiment, the first region 131 and the second infiltrated region 132 may be infiltrated simultaneously with different infiltrants during a second HPHT process wherein an at least partially leached and cleaned PCD table 128 is bonded to the substrate 108. In an embodiment, a first non-catalyzing infiltrant may be positioned adjacent to the at least partially leached and cleaned PCD table 128 opposite the substrate 108, the substrate may comprise a group VIIIB infiltrant (e.g., cobalt) and be positioned opposite the non-catalyzing infiltrant wherein both infiltrants infiltrate the at least partially leached and cleaned PCD table 128 under HPHT conditions thereby forming the first region 131 and the second infiltrated region 132 in the at least partially leached, cleaned and infiltrated PCD table 130.

It is noted that the PDC 120' may exhibit other geometries than the geometry illustrated in FIG. 1F. For example, the PDC 120' may exhibit a non-cylindrical geometry. Other HPHT processes, cleaning processes, and resultant PDCs may be formed according to other techniques as disclosed in U.S. patent application Ser. No. 13/027,954 and U.S. Pat. Nos. 7,845,438 and 8,236,074, which are incorporated herein, in their entirety, by this reference.

In an embodiment, the act 340 of bonding the at least partially leached and cleaned PCD body 128 to the substrate 108 may include brazing the at least partially leached and cleaned PCD body 128 to the substrate 108. In an embodiment, a braze material configured to bond the at least partially leached and cleaned PCD body 128 to the substrate 108 may be disposed between the PCD body and the substrate and then subjected to HPHT conditions, wherein the brazing material bonds the PCD body to the substrate by infiltrating the at least partially leached and cleaned PCD body 128 and cooling therein.

It is contemplated that the leaching and cleaning techniques and apparatuses described herein may be utilized and or adopted for use with a PDC (i.e., a PCD table still bonded to a substrate). In an embodiment, a PCD table may be bonded to a substrate and portions of the PCD table and/or substrate may be masked to contain leaching only to desire areas of the PDC. The masked PDC may be leached similarly to the methods described above. The resulting at least partially leached PDC may be inserted into a pressure vessel suitable for holding a PDC, after which the PDC may undergo cleaning substantially as described above with the removal agent 152 exiting from at least a single side surface of the PCD table bonded to a substrate. In embodiments, a PCD table on a PDC may be further leached and or cleaned, according to the methods disclosed herein, after the PCD table has been bonded to the substrate in the second HPHT process. For example, leaching and/or cleaning/removing may be carried out to a desired depth on the PCD table according to the methods described herein.

Figure 4:
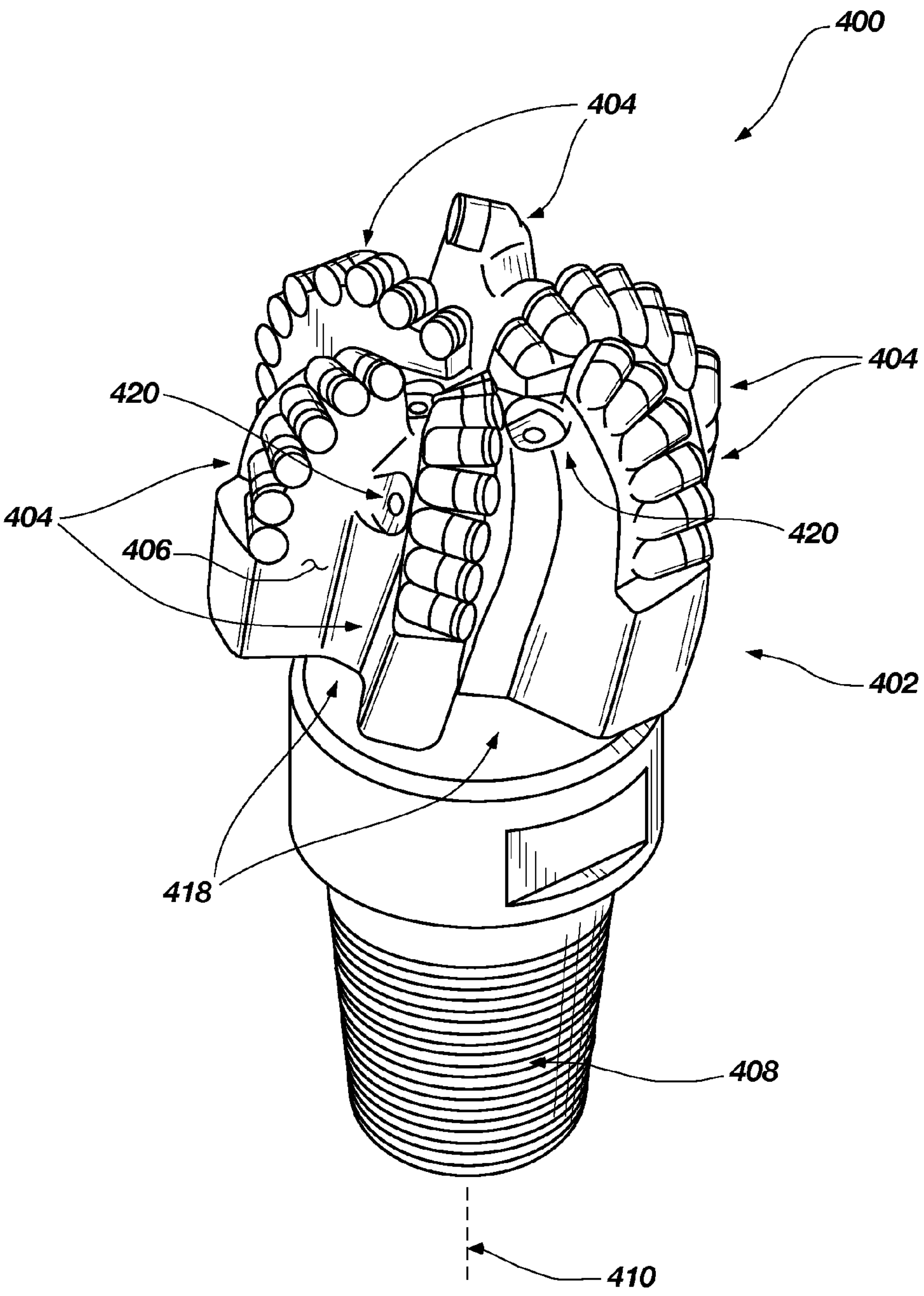
FIG. 4 is an isometric view of a rotary drill bit according to an embodiment that may employ one or more of the PDCs fabricated according to any of the embodiments disclosed herein.
Figure 5:
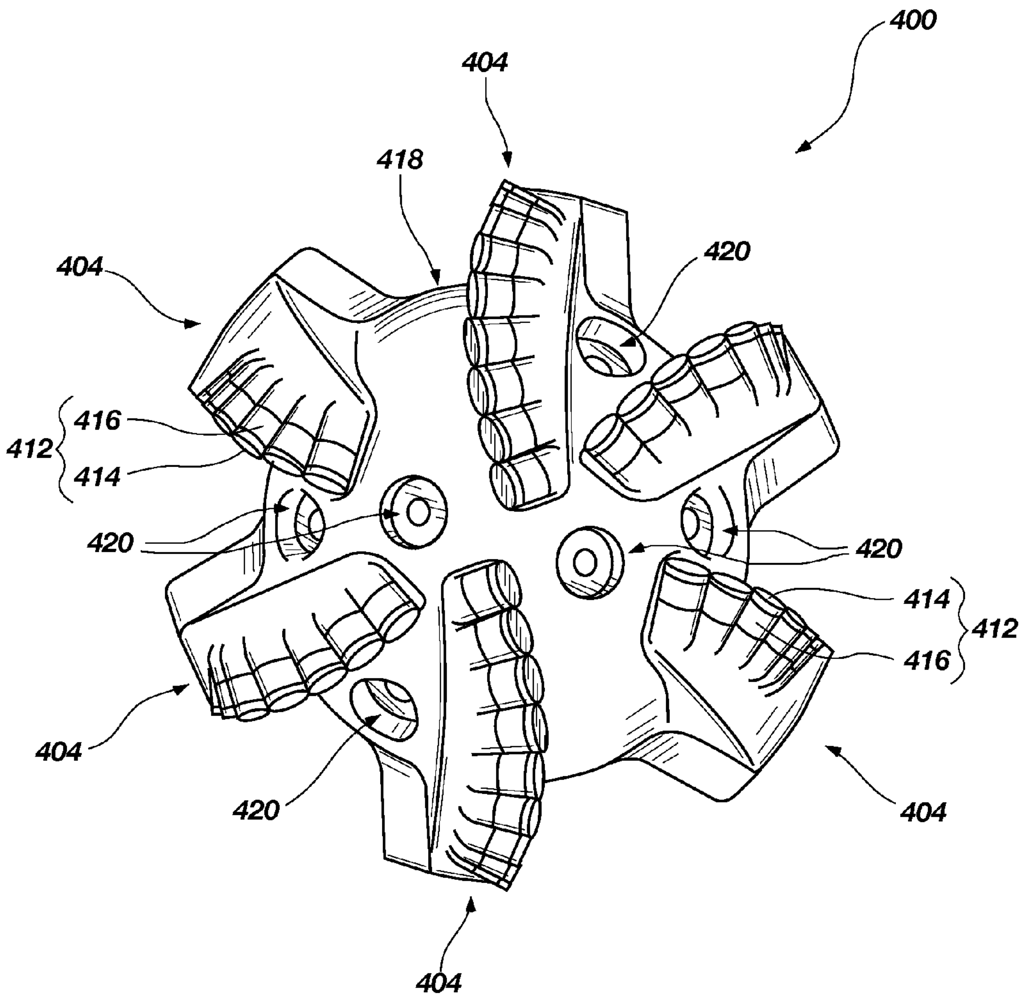
FIG. 5 is a top elevation view of the rotary drill bit shown in FIG. 4.

FIG. 4 is an isometric view and FIG. 5 is a top elevation view of a rotary drill bit 400 according to an embodiment. The rotary drill bit 400 includes at least one PDC fabricating according to any of the previously described PDC embodiments. The rotary drill bit 400 comprises a bit body 402 that includes radially and longitudinally extending blades 404 with leading faces 406, and a threaded pin connection 408 for connecting the bit body 402 to a drilling string. The bit body 402 defines a leading end structure configured for drilling into a subterranean formation by rotation about a longitudinal axis 410 and application of weight-on-bit. At least one PDC cutting element, manufactured and configured according to any of the previously described PDC embodiments (e.g., the PDC 120' shown in FIG. 1F), may be affixed to rotary drill bit 400 by, for example, brazing, mechanical affixing, or another suitable technique. With reference to FIG. 5, each of a plurality of PDCs 412 is secured to the blades 404. For example, each PDC 412 may include a PCD table 414 bonded to a substrate 416. More generally, the PDCs 412 may comprise any PDC disclosed herein, without limitation. In addition, if desired, in an embodiment, a number of the PDCs 412 may be conventional in construction. Also, circumferentially adjacent blades 404 define so-called junk slots 418 therebetween, as known in the art. Additionally, the rotary drill bit 400 includes a plurality of nozzle cavities 420 for communicating drilling fluid from the interior of the rotary drill bit 400 to the PDCs 412.

FIGS. 4 and 5 merely depict one embodiment of a rotary drill bit that employs at least one cutting element comprising a PDC fabricated and structured in accordance with the disclosed embodiments, without limitation. The rotary drill bit 400 is used to represent any number of earth-boring tools or drilling tools, including, for example, core bits, roller cone bits, fixed cutter bits, eccentric bits, bicenter bits, reamers, reamer wings, mining rotary drill bits, or any other downhole tool including PDCs, without limitation.

The PDCs disclosed herein may also be utilized in applications other than rotary drill bits. For example, the disclosed PDC embodiments may be used in thrust-bearing assemblies, radial bearing assemblies, wire-drawing dies, artificial joints, machining elements, PCD windows, and heat sinks.

Figure 6:
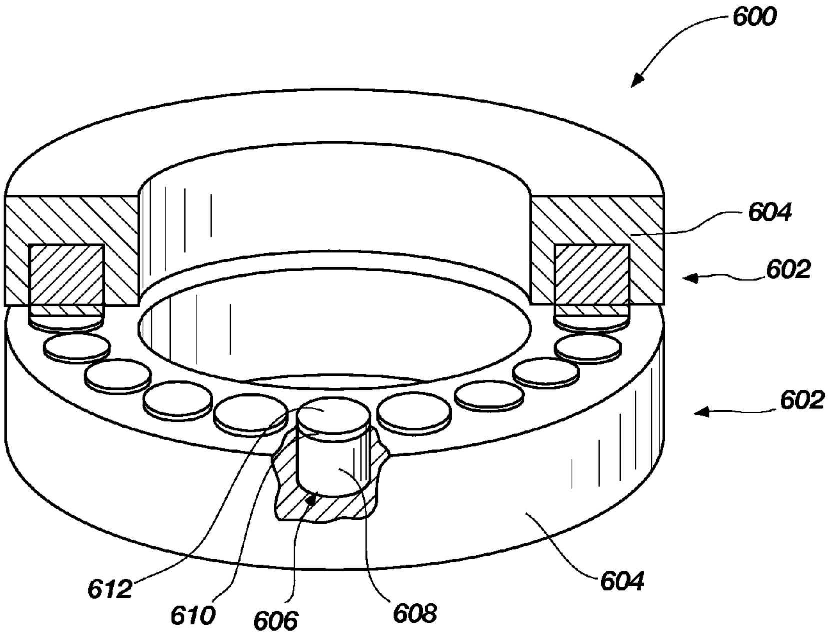
FIG. 6 is an isometric cut-away view of a thrust-bearing apparatus according to an embodiment, which may utilize any of the disclosed PDC fabricated according to any of the embodiments disclosed herein as bearing elements.

FIG. 6 is an isometric cut-away view of a thrust-bearing apparatus 600 according to an embodiment, which may utilize any of the disclosed PDC embodiments as bearing elements. The thrust-bearing apparatus 600 includes respective thrust-bearing assemblies 602. Each thrust-bearing assembly 602 includes an annular support ring 604 that may be fabricated from a material, such as carbon steel, stainless steel, or another suitable material. Each support ring 604 includes a plurality of recesses (not labeled) that receives a corresponding bearing element 606. Each bearing element 606 may be mounted to a corresponding support ring 604 within a corresponding recess by brazing, press-fitting, using fasteners, combinations thereof, or another suitable mounting technique. One or more, or all of bearing elements 606 may be manufactured and configured according to any of the disclosed PDC embodiments. For example, each bearing element 606 may include a substrate 608 and a PCD table 610, with the PCD table 610 including a bearing surface 612.

In use, the bearing surfaces 612 of one of the thrust-bearing assemblies 602 bears against the opposing bearing surfaces 612 of the other one of the bearing assemblies 602. For example, one of the thrust-bearing assemblies 602 may be operably coupled to a shaft to rotate therewith and may be termed a “rotor.” The other one of the thrust-bearing assemblies 602 may be held stationary and may be termed a “stator.”

Figure 7:
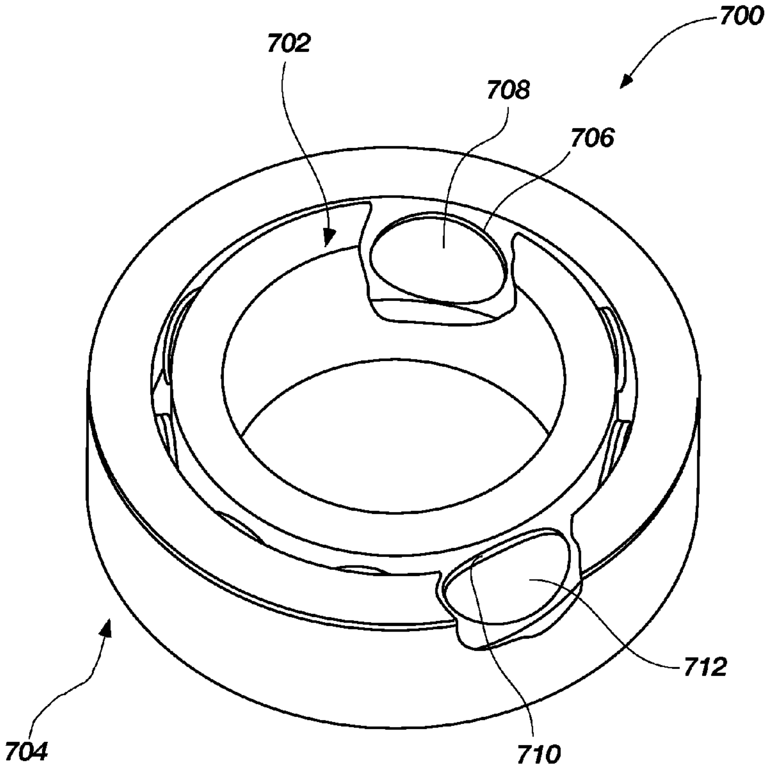
FIG. 7 is an isometric cut-away view of a radial bearing apparatus according to an embodiment, which may utilize any of the disclosed PDC fabricated according to any of the embodiments disclosed herein as bearing elements.

FIG. 7 is an isometric cut-away view of a radial bearing apparatus 700 according to an embodiment, which may utilize any of the disclosed PDC embodiments as bearing elements. The radial bearing apparatus 700 includes an inner race 702 positioned generally within an outer race 704. The outer race 704 includes a plurality of bearing elements 706 affixed thereto that have respective bearing surfaces 708. The inner race 702 also includes a plurality of bearing elements 710 affixed thereto that have respective bearing surfaces 712. One or more, or all of the bearing elements 706 and 710 may be configured according to any of the PDC embodiments disclosed herein. The inner race 702 is positioned generally within the outer race 704, with the inner race 702 and outer race 704 configured so that the bearing surfaces 708 and 712 may at least partially contact one another and move relative to each other as the inner race 702 and outer race 704 rotate relative to each other during use.

While various aspects and embodiments have been disclosed herein, other aspects and embodiments are contemplated. The various aspects and embodiments disclosed herein are for purposes of illustration and are not intended to be limiting. Additionally, the words “including,” “having,” and variants thereof (e.g., “includes” and “has”) as used herein, including the claims, shall be open ended and have the same meaning as the word “comprising” and variants thereof (e.g., “comprise” and “comprises”).

The invention claimed is:

1. A method of cleaning an at least partially leached polycrystalline diamond body, the method comprising:

positioning the at least partially leached polycrystalline diamond body within a pressure vessel such that at least one surface of the at least partially leached polycrystalline diamond body is exposed to an environment inside of the pressure vessel and at least one surface is exposed to an environment outside of the pressure vessel;

at least partially filling the pressure vessel with a removal agent;

elevating a pressure of the removal agent in the pressure vessel relative to an ambient atmospheric pressure of the environment outside of the pressure vessel; and exposing the at least partially leached polycrystalline diamond body to the removal agent in the pressure vessel.

2. The method of claim 1, wherein exposing the at least partially leached polycrystalline diamond body to the removal agent in the pressure vessel includes diffusing the removal agent through the at least partially leached polycrystalline diamond body to the environment outside of the pressure vessel.

3. The method of claim 1, wherein positioning the at least partially leached polycrystalline diamond body within a pressure vessel includes forming an interior volume within the pressure vessel between at least one sidewall, a back wall, and a surface of the polycrystalline diamond body.

4. The method of claim 3, wherein the interior volume includes the removal agent therein.

5. The method of claim 1, wherein elevating a pressure of a removal agent in the pressure vessel includes heating the removal agent to create an increased vapor pressure.

6. The method of claim 5, wherein heating the removal agent includes operating a heating element located within the pressure vessel.

7. The method of claim 5, wherein heating the removal agent includes operating a heating system positioned outside of the pressure vessel including one or more of an oven, kiln, heating element, induction heating system, microwave system, or a salt bath.

8. The method of claim 1, wherein elevating a pressure of a removal agent in the pressure vessel includes using a pump.

9. The method of claim 1, wherein the removal agent includes one or more of an aqueous component, a supercritical component, a chelating component, inorganic component, or an organic component.

10. The method of claim 9, wherein the aqueous component includes at least one of sodium hydroxide, potassium hydroxide, lithium hydroxide, hydrochloric acid, nitric acid, hydrofluoric acid, sulfuric acid, or aqua regia.

11. The method of claim 9, wherein the supercritical component includes one or more of water or carbon dioxide.

12. The method of claim 9, wherein the chelating component includes one or more of sodium bis-(2-ethylhexyl)sulfosuccinate, a fluorinated sodium bis-(2-ethylhexyl)sulfosuccinate, or a perfluoropolyether phosphate.

13. The method of claim 9, wherein the organic component includes at least one chemical selected from the group consisting of methane, ethane, propane, ethylene, propylene, methanol, ethanol, acetone, pentane, butane, sulfur hexafluoride, xenon dichlorodifluoromethane, trifluoromethane, isopropanol, nitrous oxide, ammonia, methylamine, and diethyl ether.

14. A method of cleaning an at least partially leached polycrystalline diamond body, the method comprising:

positioning the at least partially leached polycrystalline diamond body within a pressure vessel such that at least one surface of the at least partially leached polycrystalline diamond body is exposed to an environment inside of the pressure vessel and at least one is surface exposed to an environment outside of the pressure vessel;

at least partially filling the pressure vessel with a removal agent including at least one of a supercritical component, an aqueous component, a chelating component, or an organic component;

elevating a pressure and a temperature of the removal agent in the pressure vessel relative to an ambient atmospheric pressure and temperature of the environment outside of the pressure vessel to induce a supercritical state in at least one component of the removal agent; and exposing the at least partially leached polycrystalline diamond body to the removal agent.

15. The method of claim 14 wherein exposing the at least partially leached polycrystalline diamond body to the removal agent includes diffusing the removal agent through the at least partially leached polycrystalline diamond body.

16. The method of claim 14, wherein the supercritical component includes one or more of water or carbon dioxide.

17. The method of claim 16, wherein the pressure within the pressure vessel is more than about 7.3 MPa and the temperature within the pressure vessel is more than about 31° C.

18. The method of claim 16, wherein the pressure within the pressure vessel is more than about 22.1 MPa and the temperature within the pressure vessel is more than about 374° C.

19. The method of claim 15, wherein the aqueous component includes one or more of sodium hydroxide, potassium hydroxide, lithium hydroxide, hydrochloric acid, nitric acid, hydrofluoric acid, sulfuric acid, phosphoric acid, potassium permanganate, or aqua regia.

20. The method of claim 15, wherein the organic component includes one or more of methane, ethane, propane, ethylene, propylene, methanol, ethanol, acetone, pentane, butane, sulfur hexafluoride, xenon dichlorodifluoromethane, trifluoromethane, isopropanol, nitrous oxide, ammonia, methylamine, or diethyl ether.

* * * * *